(12) United States Patent
Orbe

(10) Patent No.: US 12,078,340 B2
(45) Date of Patent: Sep. 3, 2024

(54) TOTAL INTERNAL REFLECTION LENS

(71) Applicant: SIGNIFY HOLDING B.V., Eindhoven (NL)

(72) Inventor: Orestes Orbe, Fairburn, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/035,542

(22) PCT Filed: Nov. 4, 2021

(86) PCT No.: PCT/EP2021/080600
§ 371 (c)(1),
(2) Date: May 5, 2023

(87) PCT Pub. No.: WO2022/096554
PCT Pub. Date: May 12, 2022

(65) Prior Publication Data
US 2023/0417394 A1    Dec. 28, 2023

Related U.S. Application Data

(60) Provisional application No. 63/110,609, filed on Nov. 6, 2020.

(30) Foreign Application Priority Data

Nov. 17, 2020   (EP) ..................................... 20207945

(51) Int. Cl.
*F21V 7/00*     (2006.01)
*F21V 5/04*     (2006.01)
*G02B 19/00*    (2006.01)

(52) U.S. Cl.
CPC .............. *F21V 7/0091* (2013.01); *F21V 5/04* (2013.01); *G02B 19/0028* (2013.01)

(58) Field of Classification Search
CPC ...... F21V 7/0091; F21V 5/04; G02B 19/0028
See application file for complete search history.

(56) References Cited

U.S. PATENT DOCUMENTS

| 10,697,611 B2 * | 6/2020 | Sayers ............... G02B 19/0028 |
| 2009/0109670 A1 * | 4/2009 | Boyer ..................... F21V 17/02 362/253 |

(Continued)

FOREIGN PATENT DOCUMENTS

| CN | 105546432 A | 5/2016 |
| CN | 206817388 U | 12/2017 |

(Continued)

*Primary Examiner* — Tracie Y Green
*Assistant Examiner* — Michael Chiang

(57) ABSTRACT

An asymmetric total internal reflector (TIR) lens and a luminaire including a plurality of asymmetric TIR lenses designed to provide increased control on spill light and produce asymmetric distribution within each TIR lens and that does not require a secondary optic arranged at an exit plane of the TIR lens. The TIR lenses disclosed herein utilize a refractive member having a plurality of portions, each portion includes a middle longitudinal edge, a middle lateral edge; and a middle corner formed between the middle longitudinal edge and the middle lateral edge. The TIR lens also includes a collimator arranged about the refractive member that includes an inner surface configured to receive electromagnetic radiation from the refractive member and reflect or refract it through an exit plane of the TIR lens.

13 Claims, 11 Drawing Sheets

(56) References Cited

U.S. PATENT DOCUMENTS

| | | | |
|---|---|---|---|
| 2013/0265777 A1* | 10/2013 | Zollers | G02B 19/0028 |
| | | | 362/335 |
| 2014/0112003 A1* | 4/2014 | Lacroix | G02B 19/0061 |
| | | | 362/329 |
| 2016/0053971 A1 | 2/2016 | Takizawa | |
| 2016/0223157 A1* | 8/2016 | Saito | G02B 19/0028 |
| 2018/0372302 A1* | 12/2018 | Orbe | F21V 7/09 |
| 2019/0011110 A1 | 1/2019 | Kim | |
| 2019/0094557 A1 | 3/2019 | Xu et al. | |

FOREIGN PATENT DOCUMENTS

| | | |
|---|---|---|
| EP | 3527880 A1 | 8/2019 |
| WO | 2012159861 A1 | 11/2012 |
| WO | 2016071845 A1 | 5/2016 |
| WO | 2016165987 A1 | 10/2016 |
| WO | 2018151224 A1 | 8/2018 |

* cited by examiner

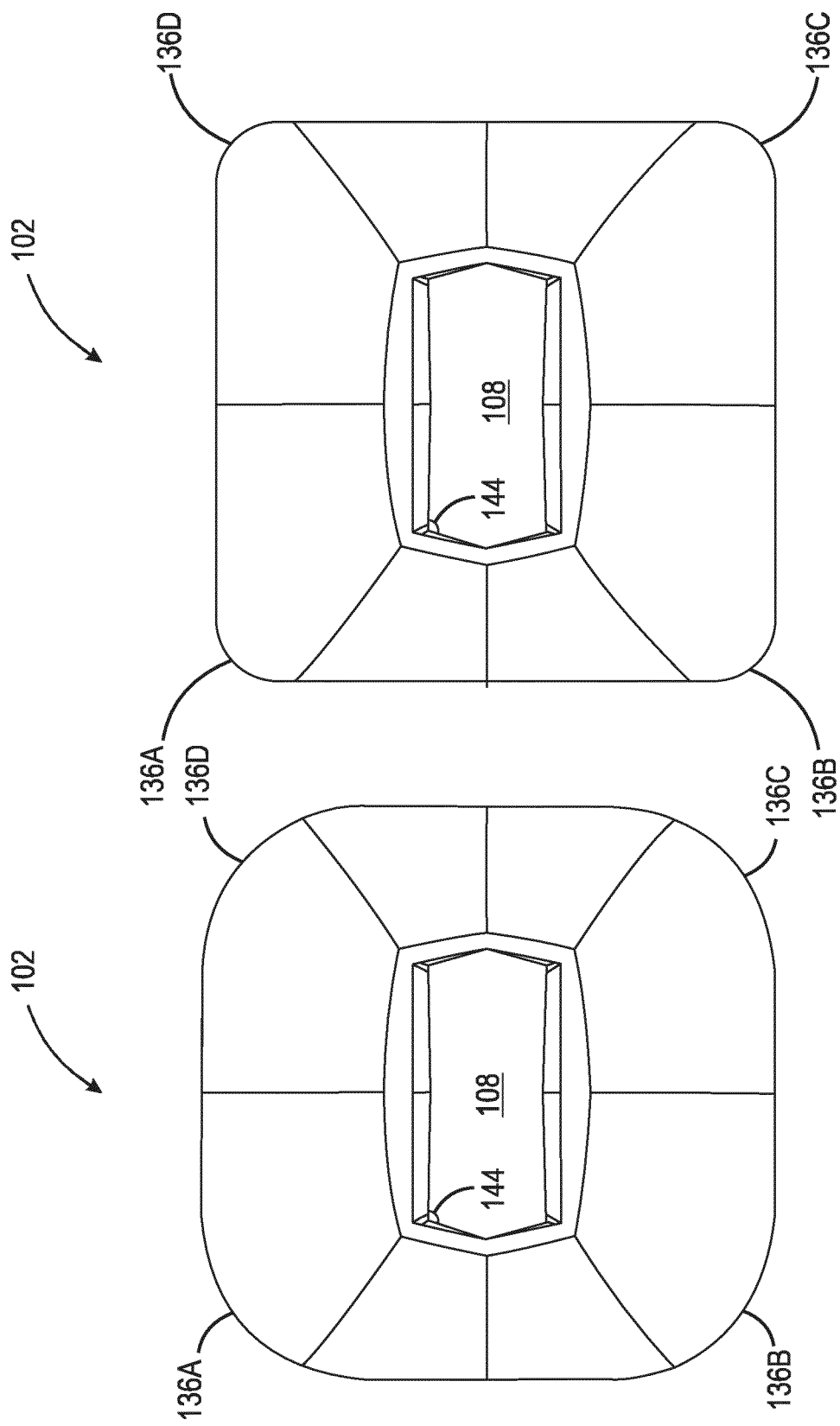

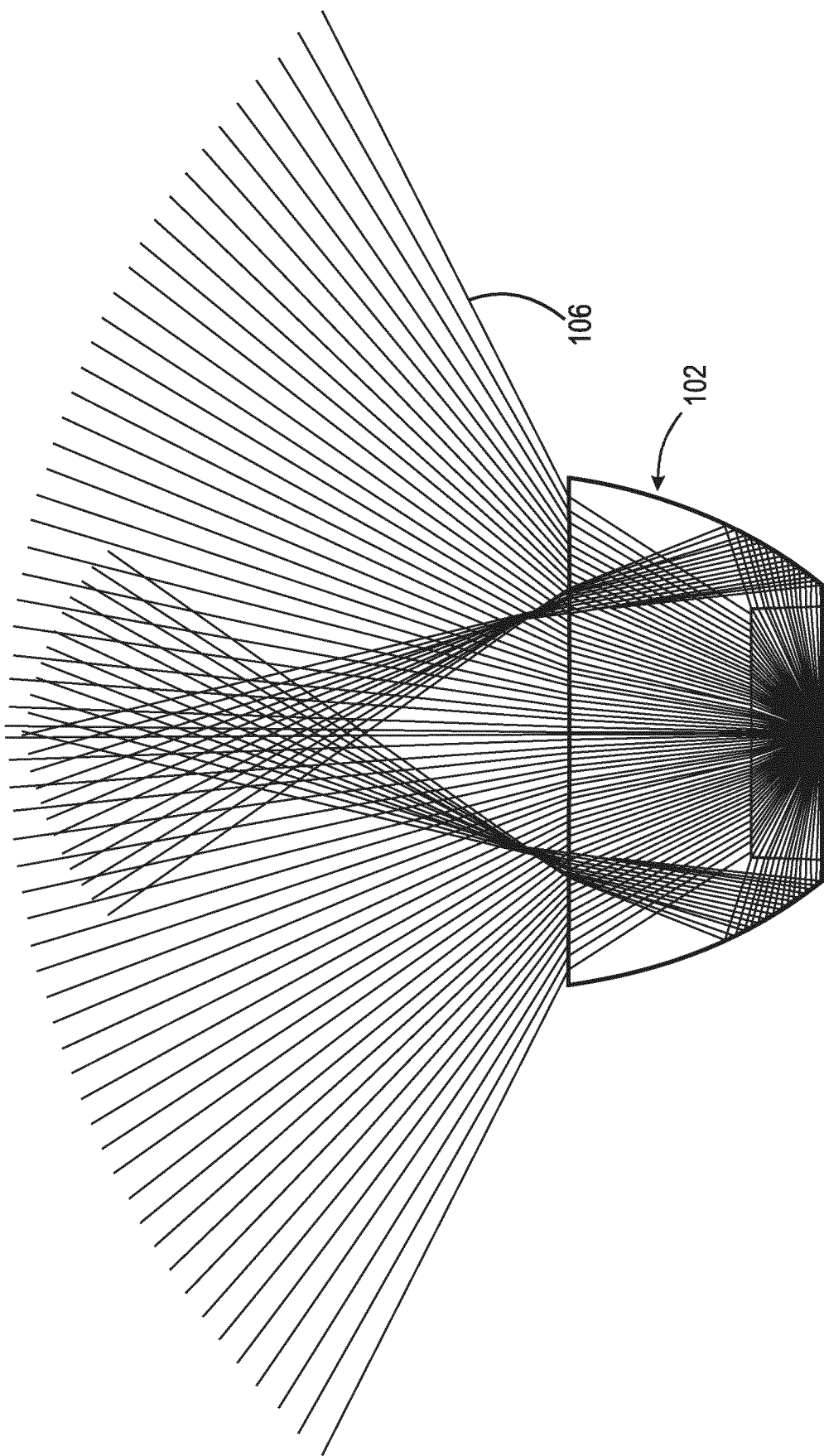

TOTAL INTERNAL REFLECTION LENS

CROSS-REFERENCE TO PRIOR APPLICATIONS

This application is the U.S. National Phase application under 35 U.S.C. § 371 of International Application No. PCT/EP2021/080600, filed on Nov. 4, 2021, which claims the benefit of U.S. Provisional Patent Application No. 63/110,609, filed on Nov. 6, 2020 and European Patent Application No. 20207945.5, filed on Nov. 17, 2020. These applications are hereby incorporated by reference herein.

FIELD OF THE DISCLOSURE

The present disclosure is directed generally to lighting systems, specifically, to lighting systems that comprise on or more total internal reflector (TIR) lenses.

BACKGROUND

Wall grazer light fixtures typically utilize round TIR lenses that produce a narrow light beam between 8-10 degrees. Additionally, the rounded TIR lenses usually use a secondary optic to spread the light beam produced along the fixture plane to produce asymmetric beams for different applications. The secondary optic can take the form of a spread film, spread lens, or in some cases lenslets on the face of the TIR optic itself. This typically results in low optical efficiencies due to the addition of extra lenses to spread the light, limited light control with the spread lens or film which produces uncontrolled high angle light causing striations and flares or hot spots in the light produced, and requires larger overall optics since there is a need to over-design to account for the extra spread of the secondary lens or film.

SUMMARY OF THE DISCLOSURE

The present disclosure relates to an asymmetric TIR lens and a luminaire including a plurality of asymmetric TIR lenses designed to provide increased control of spill light and distribution within each TIR lens and that does not require a secondary optic arranged at an exit plane of the TIR lens. The TIR lenses disclosed herein utilize a refractive member having a plurality of portions, each portion includes a middle longitudinal edge, a middle lateral edge; and a middle corner formed between the middle longitudinal edge and the middle lateral edge. The TIR lens also includes a collimator arranged about the refractive member that includes an inner surface configured to receive light rays or electromagnetic radiation from the refractive member and reflect or refract it through an exit plane of the TIR lens.

In one example, a total internal reflection (TIR) lens is provided, the TIR lens including: a refractive member having a body protruding in a first direction with respect to an electromagnetic source, the refractive member configured to receive electromagnetic radiation from the electromagnetic source and reflect or refract the electromagnetic radiation, the refractive member comprising: a first portion having a first length and a first width, the first width less than the first length, the first portion including: a first middle longitudinal edge; a first middle lateral edge; and a first middle corner formed between the first middle longitudinal edge and the first middle lateral edge; and a collimator arranged about the refractive member, the collimator including: an inner surface configured to receive at least a portion of the reflected or refracted electromagnetic-radiation from the refractive member and reflect or refract the electromagnetic radiation through an exit plane of the TIR lens. In one aspect, the refractive member further includes: a second portion having the first length and the first width, the second portion including a second middle longitudinal edge; a second middle lateral edge; and a second middle corner formed between the second middle longitudinal edge and the second middle lateral edge.

In one aspect, the refractive member further includes a central edge positioned between the first middle lateral edge and the second middle lateral edge and arranged substantially parallel with the first middle longitudinal edge and the second middle longitudinal edge.

In one aspect, the first middle longitudinal edge and the first middle lateral edge are straight edges.

In one aspect, the refractive member further includes: a first bottom longitudinal edge; a first bottom lateral edge; and a first bottom corner formed between the first bottom longitudinal edge and the first bottom lateral edge.

In one aspect, the first bottom longitudinal edge and the first bottom lateral edge are straight edges.

In one aspect, the refractive member further includes a second bottom longitudinal edge; a second bottom lateral edge; and a second bottom corner formed between the second bottom longitudinal edge and the second bottom lateral edge.

In one aspect, the collimator further includes a first top longitudinal edge; a first top lateral edge; and a first top corner formed between the first top longitudinal edge and the first top lateral edge.

In one aspect, the first top corner is filleted, wherein the fillet is selected from a range between 0.254 cm and 0.635 cm.

In one aspect, the collimator further includes a second top longitudinal edge; a second top lateral edge; and a second top corner formed between the second top longitudinal edge and the second top lateral edge.

In one aspect, an angle created between the first middle longitudinal side edge and the first middle lateral side edge is obtuse.

In one aspect, the first middle corner is chamfered, filleted, or curved.

In one example, a luminaire having a plurality of total internal reflection (TIR) lenses is provided, each TIR lens of the plurality of TIR lenses, including a refractive member having a body protruding in a first direction with respect to an electromagnetic source, the refractive member configured to receive electromagnetic radiation from the electromagnetic-source and reflect or refract the electromagnetic radiation, the refractive member including: a first portion having a first length and a first width, the first width less than the first length, the first portion including: a first middle longitudinal edge; a first middle lateral edge; and a first middle corner formed between the first middle longitudinal edge and the first middle lateral edge; and a collimator arranged about the refractive member, the collimator including: an inner surface configured to receive at least a portion of the reflected or refracted electromagnetic radiation from the refractive member and reflect or refract the electromagnetic radiation through an exit plane of the TIR lens.

In one aspect, the first middle longitudinal edge and the first middle lateral edge are straight edges.

In one aspect, the luminaire is a wall grazer.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 7A is a top plan view of a TIR lens according to the present disclosure.

FIG. 7B is a top plan view of a TIR lens according to the present disclosure.

FIG. 9 is a longitudinal cross-sectional profile of a TIR lens according to the present disclosure.

DETAILED DESCRIPTION OF EMBODIMENTS

The present disclosure is related to an asymmetric TIR lens and a luminaire including a plurality of asymmetric TIR lenses designed to provide increased control of light spill and an asymmetric distribution within each TIR lens and that does not require a secondary optic arranged at an exit plane of the TIR lens. The TIR lenses disclosed herein utilize a refractive member having a plurality of portions, each portion includes a middle longitudinal edge, a middle lateral edge; and a middle corner formed between the middle longitudinal edge and the middle lateral edge. The TIR lens also includes a collimator arranged about the refractive member that includes an inner surface configured to receive electromagnetic radiation from the refractive member and reflect or refract it through an exit plane of the TIR lens.

Figure 1:
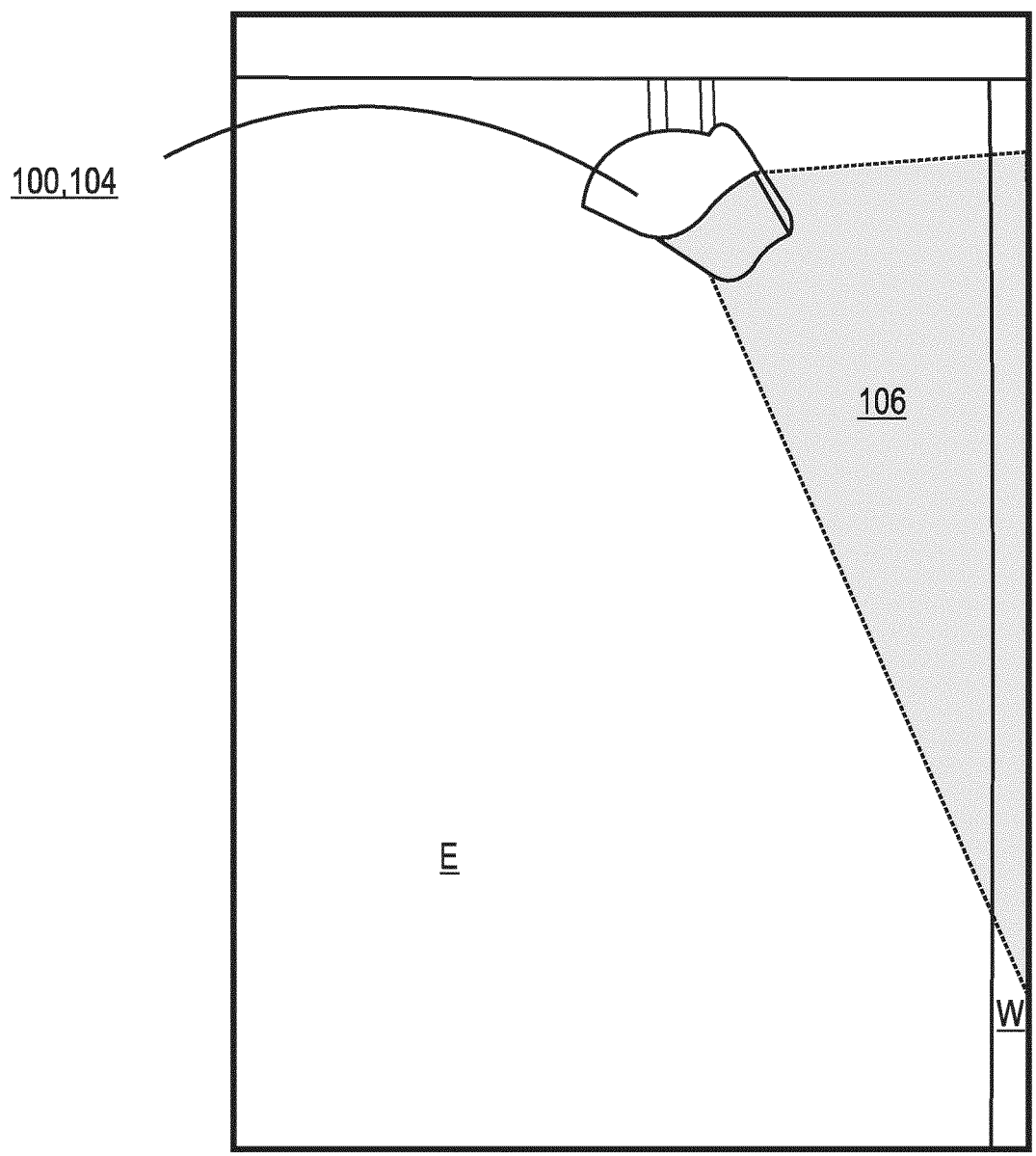
FIG. 1 is a schematic view of a luminaire in an environment according to the present disclosure.

The following description should be read in view of FIGS. 1-11B. FIG. 1 illustrates a schematic view of luminaire 100 within environment E according to the present disclosure. As shown in FIG. 1, luminaire 100 is intended to be a wall grazer, i.e., a luminaire configured to be installed proximate to and facing a wall W and/or the floor beneath the luminaire, such that the wall W, and—through subsequent reflection off the wall W—the environment E, can be illuminated. It should be appreciated that luminaire 100 may be configured as a recessed cove lighting fixture, a wall wash lighting fixture, an indirect pendant lighting fixture, a direct pendant lighting fixture, a wall sconce, an under-cabinet lighting fixture, or any other lighting fixture configuration arranged to provide substantially direct illumination to a planar surface within environment E. Environment E is intended to be an indoor location, such as an office, residential, or commercial space, having at least one wall W or other substantially planar object that a user desires to have illuminated. It should be appreciated that environment E may be an outdoor location as well. As will be discussed below, luminaire 100 includes a plurality of total internal reflection (TIR) lenses 102 and a plurality of electromagnetic radiation sources 104. Each electromagnetic radiation source 104 is configured to convert electrical energy into electromagnetic radiation 106, and each TIR lens 102 is configured to receive, reflect, and/or refract electromagnetic radiation 106 produced by the plurality of electromagnetic radiation sources 104 into environment E, with a specific asymmetric beam shape.

As described herein, luminaire 100 includes a plurality of electromagnetic radiation sources 104 configured to convert electrical energy into electromagnetic radiation 106. In one example, each electromagnetic radiation source 104 is a Light-Emitting Diode (LED) or a cluster of LEDs. It should be appreciated that various LEDs may be utilized, for example, Organic LEDs, phosphor-based LEDs, etc. In the examples provided herein, the electromagnetic radiation sources 104 are arranged to provide electromagnetic radiation 106 to environment E where electromagnetic radiation 106 is visible light or light having a wavelength that places it in the visible light range, e.g., 380-700 nm.

For clarity, and although it should be understood that luminaire 100 can include a plurality of TIR lenses 102 and a respective plurality of electromagnetic radiation sources 104, the following description will refer to these components in the singular; however, it should be appreciated that the components, structure, function, etc., provided with respect to the TIR lens 102 and electromagnetic radiation source 104 discussed below, applies to all TIR lenses 102 and all of the electromagnetic radiation sources 104 of the pluralities discussed above.

Figure 2:
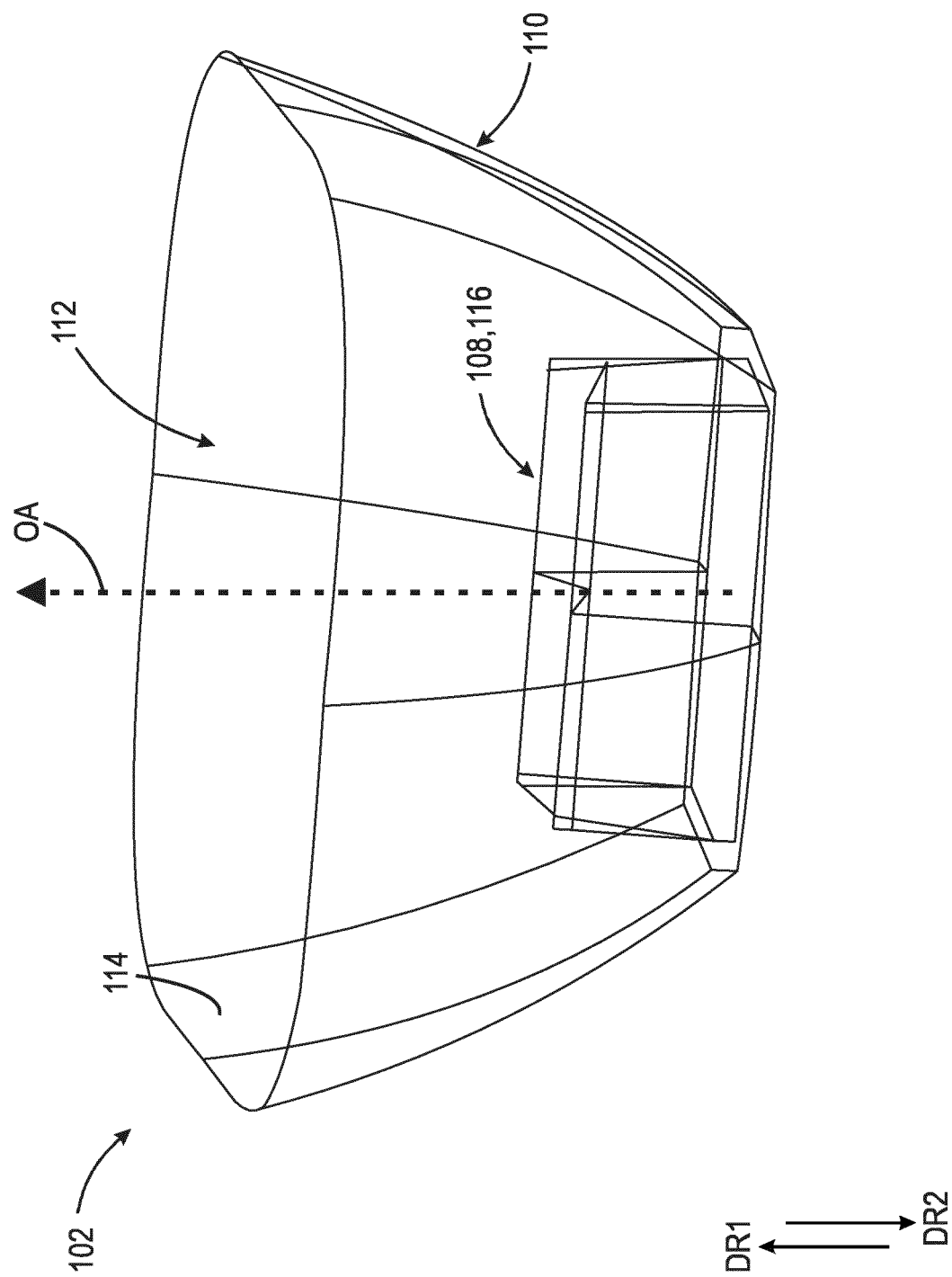
FIG. 2 is a perspective view of a TIR lens according to the present disclosure.

In one example, illustrated in FIGS. 2-7, TIR lens 102 includes a refractive member 108 (discussed below) and a collimator 110 and an imaginary exit plane 112. Collimator 110 includes a contoured inner surface 114 configured to receive electromagnetic radiation 106 (hereinafter referred to as "radiation 106") and reflect and/or collimate the received radiation 106 substantially along an optical axis OA of the TIR lens 102 and through exit plane 112. It should be appreciated that although illustrated in FIGS. 2-7 as a hollow body, e.g., where the volume within the inner surface of collimator 110 is substantially empty space, collimator 110 may be a substantially solid body made from transparent or translucent materials, e.g., silicon or polycarbonate glass. During operation (discussed below) radiation 106 is configured to pass through the geometry of the refractive member 108, and, for example, refract toward inner surface 114 of collimator 110. Radiation 106 can then reflect off of inner surface 114 along optical axis OA and toward exit plane 112 of the TIR lens 102. FIG. 2 illustrates that refractive member 108 has a body 116 protruding in first direction DR1 with respect to bottom (e.g., the opposite side of TIR lens 102 from exit plane 112) of TIR lens 102. Similarly to collimator 110, refractive member 108 may be a hollow body or may be a substantially solid body made from transparent or translucent materials, e.g., silicon or polycarbonate. As will be discussed below, body 116 of refractive member 108 can be conceptually divided into a plurality of portions, i.e., portions 118A-118D which correspond to each conceptual quadrant of TIR lens 102 as provided herein. Moreover, although described as two bodies, it should be appreciated that refractive member 108 and collimator 110 are intended to be formed as a single body, i.e., where each component is integral with the other.

Figure 3A:
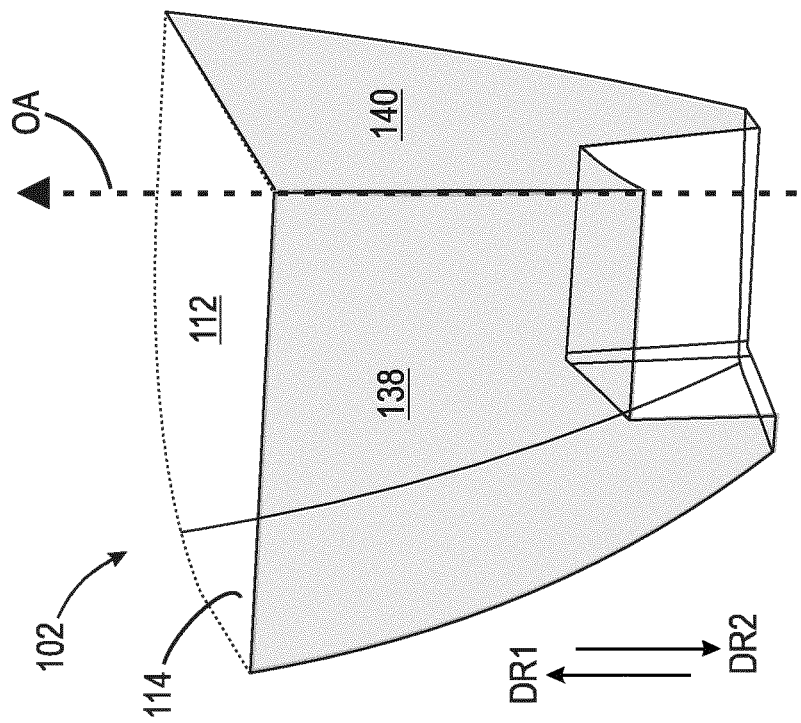
FIG. 3A is a cross-sectional view of a TIR lens according to the present disclosure.

FIG. 3A illustrates a perspective view of a single quadrant of TIR lens 102 for clarity. As illustrated, refractive member 108 includes a first portion 118A corresponding to the first quadrant of the TIR lens 102 as shown. First portion 118A of refractive member 108 includes a bottom longitudinal edge 120A, a bottom lateral edge 122A, and a bottom corner 124A. Bottom longitudinal edge 120A is intended to represent the boundary edge between the bottom of the TIR lens 102 and the bottom of the first portion 118A of refractive member 108. In one example, as illustrated in FIG. 3A, bottom longitudinal edge 120A and bottom lateral edge 122A are both straight edges, e.g., substantially form straight lines. First portion 118A, has a first length L1 represented by bottom longitudinal edge 120A, and a first width W1 represented by bottom lateral edge 122A, where the first width W1 is less than the first length L1. Additionally, bottom longitudinal edge 120A and bottom lateral edge 122A are intended to be co-planar, i.e., exist on the same flat plane shared with the bottom of the TIR lens 102. First portion 118A also includes bottom corner 124A arranged between bottom longitudinal edge 120A and bottom lateral edge 122A. Bottom corner 124A can be a sharp corner (e.g., a vertex between the two straight lines represented by bottom longitudinal edge 120A and bottom lateral edge 122A), a chamfered corner, a filleted corner, etc. In one example, as illustrated in FIGS. 7A and 7B, the angle between the straight line formed by bottom longitudinal edge 120A and the straight line formed by bottom lateral edge 122A is obtuse; however, it should be appreciated that this angle in fully adaptable and may form a 90 degree angle or an acute angle.

First portion 118A of refractive member 108 includes a middle longitudinal edge 126A a middle lateral edge 128A and a middle corner 130A. Middle longitudinal edge 126A is intended to represent the upper boundary edge of refractive member 108 of the TIR lens 102. In one example, as illustrated in FIG. 3A, middle longitudinal edge 126A and middle lateral edge 128A are both straight edges, e.g., substantially form straight lines. First portion 118A also includes middle corner 130A arranged between middle longitudinal edge 126A and middle lateral edge 128A. Middle corner 130A can be a sharp corner (e.g., a vertex between the two straight lines represented by middle longitudinal edge 126A and middle lateral edge 128A), a chamfered corner, a filleted corner, etc. In one example, as illustrated in FIGS. 7A and 7B, the angle between the straight line formed by middle longitudinal edge 126A and the straight line formed by middle lateral edge 128A is obtuse; however, it should be appreciated that this angle in fully adaptable and may form a 90 degree angle or an acute angle. Additionally, middle lateral edge 128A may be skewed or angled with respect to a plane substantially parallel with exit plane 112. In other words, rather than middle longitudinal edge 126A and middle lateral edge 128A being co-planer, middle lateral edge 128A extends downward in direction DR2 and away from middle corner 130A.

Additionally, collimator 110 also includes a similar arrangement, i.e., collimator 110 comprises a top longitudinal edge 132A, a top lateral edge 134A, and a top corner 136A. Top longitudinal edge 132A is intended to represent the upper boundary edge of collimator 110 where it meets exit plane 112 of the TIR lens 102. In one example, as illustrated in FIG. 3A, top longitudinal edge 132A and top lateral edge 134A are both straight edges, e.g., substantially form straight lines. Collimator 110 also includes top corner 136A arranged between top longitudinal edge 132A and top lateral edge 134A. Top corner 136A can be a sharp corner (e.g., a vertex between the two straight lines represented by top longitudinal edge 132A and top lateral edge 134A), a chamfered corner, a filleted corner, etc. In one example, as illustrated in FIGS. 7A and 7B, top corner 136A is a filleted corner, where the fillet radius is selected from a range between 0.254 cm to 0.635 cm (0.1 inches to 0.25 inches). In some examples, the angle between the straight line formed by top longitudinal edge 132A and the straight line formed by top lateral edge 134A is a right angle; however, it should be appreciated that this angle in fully adaptable and may form an obtuse angle or an acute angle. Additionally, top lateral edge 134A is co-planer with top lateral edge 134A within exit plane 112.

Figure 3B:
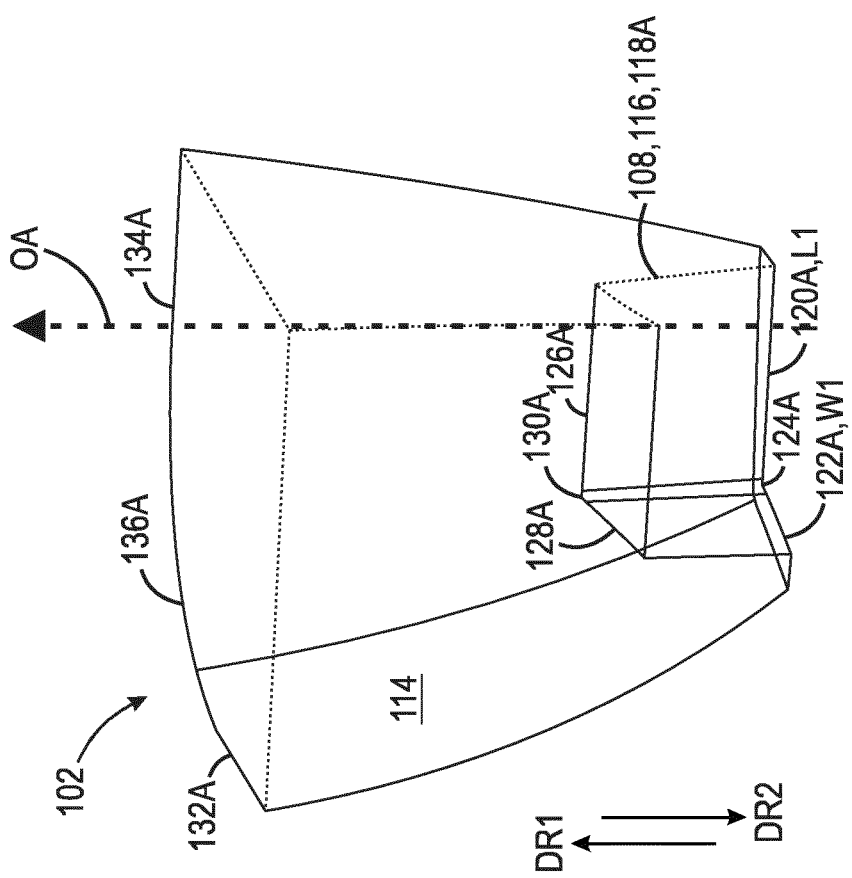
FIG. 3B is a cross-sectional view of a TIR lens according to the present disclosure.
Figure 4:
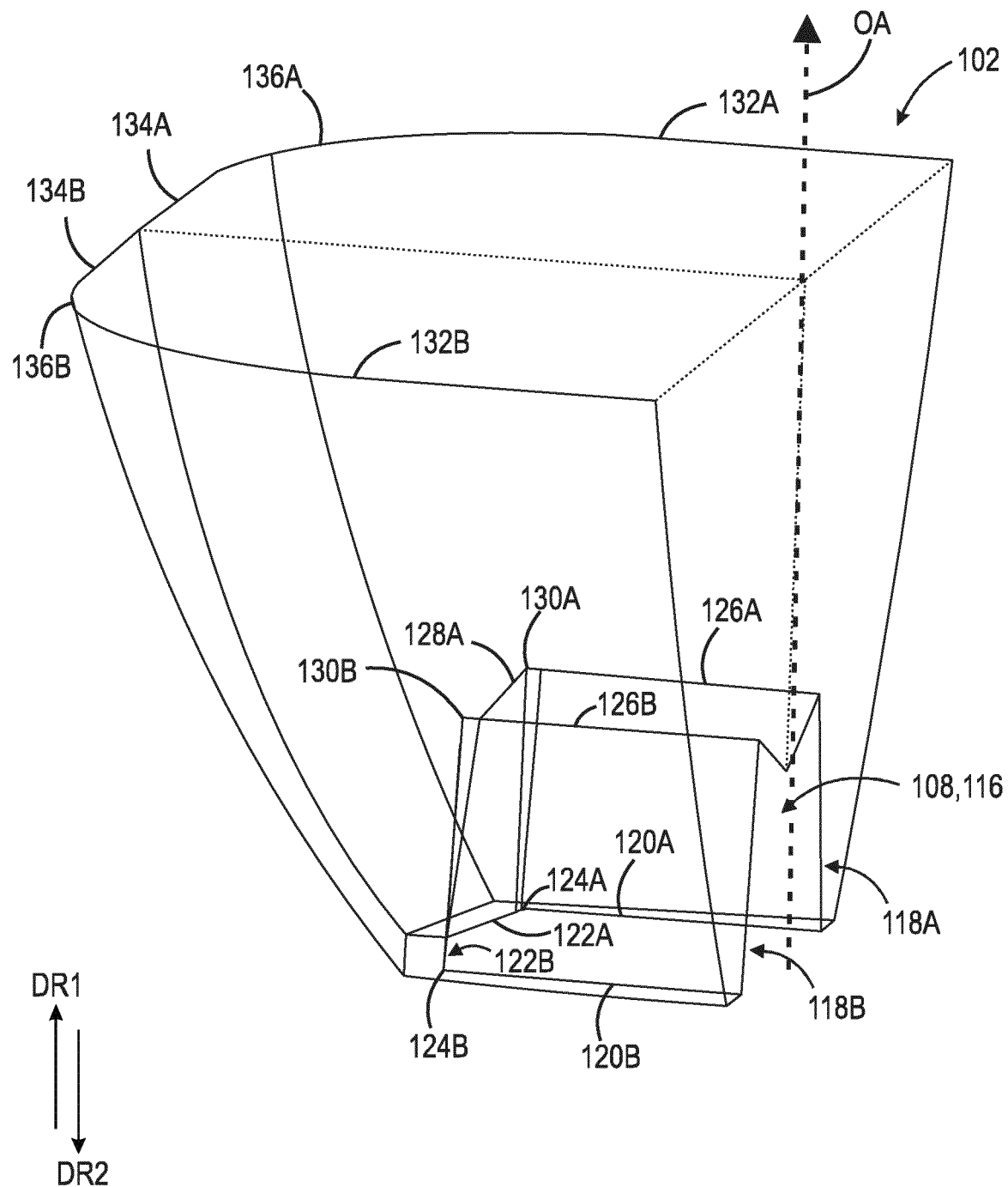
FIG. 4 is a cross-sectional view of a TIR lens according to the present disclosure.

As illustrated in FIGS. 3B and 4, the first quadrant of TIR lens 102 is formed between two cross-sectional planes, i.e., longitudinal cross-sectional plane 138 and lateral cross-sectional plane 140. Longitudinal cross-sectional plane 138 is arranged to pass through optical axis OA and is substantially parallel with bottom longitudinal edge 120A, middle longitudinal edge 126A, and top longitudinal edge 132A. Lateral cross-sectional plane 140 is arranged to pass through optical axis OA and is substantially parallel with bottom lateral edge 122A, middle lateral edge 128A, and top lateral edge 134A.

FIG. 4 illustrates two quadrants of, or a half of, TIR lens 102. The second quadrant, i.e., the quadrant closer to the viewer in FIG. 4 is a mirrored copy of the first quadrant across longitudinal cross-sectional plane 138 (shown in FIG. 3B). Therefore, similar to the first quadrant, within the second quadrant, refractive member 108 includes a second portion 118B. Second portion 118B includes a bottom longitudinal edge 120B, a bottom lateral edge 122B, and a bottom corner 124B. Bottom longitudinal edge 120B is intended to represent the boundary edge between the bottom of the TIR lens 102 and the bottom of the second portion 118B of refractive member 108. In one example, as illustrated in FIG. 4, bottom longitudinal edge 120B and bottom lateral edge 122B are both straight edges, e.g., substantially form straight lines. As second portion 118B is a mirrored version of first portion 118A, second portion 118B has a length, e.g., first length L1 represented by bottom longitudinal edge 120B, and a first width W1 represented by bottom lateral edge 122B, where the first width W1 is less than the first length L1. Additionally, bottom longitudinal edge 120B and bottom lateral edge 122B are intended to be co-planar, i.e., exist on the same flat plane shared with the bottom of the TIR lens 102. Second portion 118B also includes bottom corner 124B arranged between bottom longitudinal edge 120B and bottom lateral edge 122B. Bottom corner 124B can be a sharp corner (e.g., a vertex between the two straight lines represented by bottom longitudinal edge 120B and bottom lateral edge 122B), a chamfered corner, a filleted corner, etc. In one example, as illustrated in FIGS. 7A and 7B, the angle between the straight line formed by bottom longitudinal edge 120B and the straight line formed by bottom lateral edge 122B is obtuse; however, it should be appreciated that this angle in fully adaptable and may form a 90 degree angle or an acute angle.

Second portion 118B of refractive member 108 includes a middle longitudinal edge 126B, a middle lateral edge 128B, and a middle corner 130B. Middle longitudinal edge 126B is intended to represent the upper boundary edge of refractive member 108 of the TIR lens 102, opposite from middle longitudinal edge 126A. In one example, as illustrated in FIG. 4, middle longitudinal edge 126B and middle lateral edge 128B are both straight edges, e.g., substantially form straight lines. Second portion 118B also includes middle corner 130B arranged between middle longitudinal edge 126B and middle lateral edge 128B. Middle corner 130B can be a sharp corner (e.g., a vertex between the two straight lines represented by middle longitudinal edge 126B and middle lateral edge 128B), a chamfered corner, a filleted corner, etc. In one example, as illustrated in FIGS. 7A and 7B, the angle between the straight line formed by middle longitudinal edge 126B and the straight line formed by middle lateral edge 128B is obtuse; however, it should be appreciated that this angle in fully adaptable and may form a 90 degree angle or an acute angle. Additionally, middle lateral edge 128B may be skewed or angled with respect to a plane substantially parallel with exit plane 112. In other words, rather than middle longitudinal edge 126A and middle lateral edge 128A being co-planer, middle lateral edge 128A extends downward in direction DR2 and away from middle corner 130A.

Additionally, collimator 110 also includes a top longitudinal edge 132B, a top lateral edge 134B, and a top corner 136B. Top longitudinal edge 132B is intended to represent the upper boundary edge of collimator 110 where it meets exit plane 112 of the TIR lens 102 opposite top longitudinal edge 132A. In one example, as illustrated in FIG. 4, top longitudinal edge 132B and top lateral edge 134B are both straight edges, e.g., substantially form straight lines. Collimator 110 also includes top corner 136B arranged between top longitudinal edge 132B and top lateral edge 134B. Top corner 136B can be a sharp corner (e.g., a vertex between the two straight lines represented by top longitudinal edge 132B and top lateral edge 134B), a chamfered corner, a filleted corner, etc. In one example, as illustrated in FIGS. 7A and 7B, top corner 136B is a filleted corner, where the fillet radius is selected from a range between 0.254 cm to 0.635 cm (0.1 inches to 0.25 inches). In some examples, the angle between the straight line formed by top longitudinal edge 132B and the straight line formed by top lateral edge 134B is a right angle; however, it should be appreciated that this angle in fully adaptable and may form an obtuse angle or an acute angle. Additionally, top lateral edge 134B is co-planer with top lateral edge 134B within exit plane 112.

Figure 5:
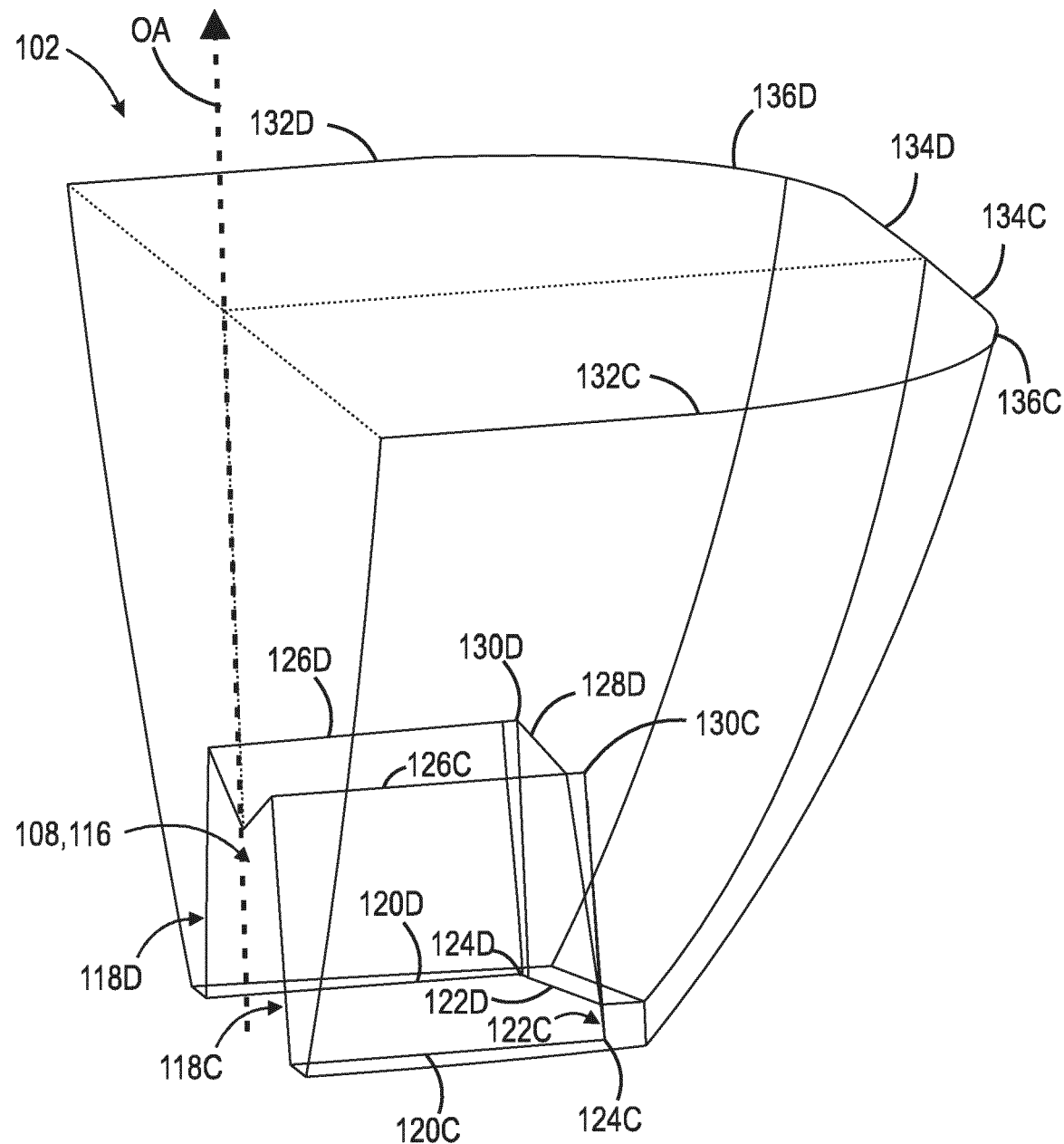
FIG. 5 is a cross-sectional view of a TIR lens according to the present disclosure.

FIG. 5 illustrates third and fourth quadrants of TIR lens 102, i.e., the other half of TIR lens 102. The third quadrant, i.e., the quadrant closest to the viewer in FIG. 5, includes third portion 118C of refractive member 108. In the example illustrated, the third quadrant is a mirrored copy of the second quadrant, mirrored across lateral cross-sectional plane 140 (illustrated in FIG. 3B). As the third quadrant is a mirrored copy of the second quadrant across lateral cross-sectional plane 140, the third quadrant comprises similar structures and components having similar or identical functionality, features, and variations as discussed above with respect to the components of the second quadrant. For example, third portion 118C of refractive member 108 includes bottom longitudinal edge 120C, bottom lateral edge 122C, and bottom corner 124C, wherein bottom longitudinal edge 120C and bottom lateral edge 122C are co-planar and are both straight edges, e.g., substantially form straight lines. Additionally, third portion 118C includes middle longitudinal edge 126C, middle lateral edge 128C and middle corner 130C, wherein middle longitudinal edge 126C and middle lateral edge 128C are co-planar and are both straight edges. Bottom corner 124C and middle corner 130C can be formed as sharp corners, chamfered corners, filleted corners, etc. Additionally, the angle between the straight line formed by bottom longitudinal edge 120C and the straight line formed by bottom lateral edge 122C is obtuse; however, it should be appreciated that this angle in fully adaptable and may form a 90 degree angle or an acute angle. Similarly, the angle formed by middle longitudinal edge 126C and the straight line formed by middle lateral edge 128C is obtuse, e.g., can be selected from any angle greater than 90 degrees. Additionally, middle lateral edge 128C may be skewed or angled with respect to a plane substantially parallel with exit plane 112. In other words, rather than middle longitudinal edge 126C and middle lateral edge 128C being co-planer, middle lateral edge 128C extends downward in direction DR2 and away from middle corner 130C.

Additionally, in the third quadrant, collimator 110 also includes top longitudinal edge 132C, top lateral edge 134C, and top corner 136C. As illustrated, top longitudinal edge 132C and top lateral edge 134C are both straight edges, e.g., substantially form straight lines. Top corner 136A can be a sharp corner, a chamfered corner, a filleted corner, etc. As outlined above with respect to top corners 136A and 136B, top corner 136C is a filleted corner, where the fillet radius is selected from a range between 0.254 cm to 0.635 cm (0.1 inches to 0.25 inches). In some examples, the angle between the straight line formed by top longitudinal edge 132C and the straight line formed by top lateral edge 134C is a right angle; however, it should be appreciated that this angle in fully adaptable and may form an obtuse angle or an acute angle. Additionally, top lateral edge 134C is co-planer with top lateral edge 134C within exit plane 112.

As shown in FIG. 5, the fourth quadrant is a mirrored copy of the first quadrant, mirrored across lateral cross-sectional plane 140 (illustrated in FIG. 3B). As the fourth quadrant is a mirrored copy of the first quadrant across lateral cross-sectional plane 140, the fourth quadrant comprises similar structures and components having similar or identical functionality, features, and variations as discussed above with respect to the components of the first quadrant. For example, fourth portion 118D of refractive member 108 includes bottom longitudinal edge 120D, bottom lateral edge 122D, and bottom corner 124D, wherein bottom longitudinal edge 120D and bottom lateral edge 122D are co-planar and are both straight edges, e.g., substantially form straight lines. Additionally, fourth portion 118D includes middle longitudinal edge 126D, middle lateral edge 128D and middle corner 130D, wherein middle longitudinal edge 126D and middle lateral edge 128D are co-planar and are both straight edges. Bottom corner 124D and middle corner 130D can be formed as sharp corners, chamfered corners, filleted corners, etc. Additionally, the angle between the straight line formed by bottom longitudinal edge 120D and the straight line formed by bottom lateral edge 122D is obtuse, i.e., at an angle of greater than 90 degrees. Similarly, the angle formed by middle longitudinal edge 126D and the straight line formed by middle lateral edge 128D is obtuse, i.e., at any angle greater than 90 degrees. Additionally, middle lateral edge 128D may be skewed or angled with respect to a plane substantially parallel with exit plane 112. In other words, rather than middle longitudinal edge 126D and middle lateral edge 128D being co-planer, middle lateral edge 128D extends downward in direction DR2 and away from middle corner 130D.

Additionally, in the fourth quadrant, collimator 110 also includes top longitudinal edge 132D, top lateral edge 134D, and top corner 136D. As illustrated, top longitudinal edge 132D and top lateral edge 134D are both straight edges, e.g., substantially form straight lines. Top corner 136D can be a sharp corner, a chamfered corner, a filleted corner, etc. As outlined above with respect to top corners 136A, 136B, and 136C, top corner 136D is a filleted corner, where the fillet radius is selected from a range between 0.254 cm to cm (0.1 inches to 0.25 inches). In some examples, the angle between the straight line formed by top longitudinal edge 132D and the straight line formed by top lateral edge 134D is a right angle; however, it should be appreciated that this angle in fully adaptable and may form a an obtuse angle or an acute angle. Additionally, top lateral edge 134D is co-planer with top lateral edge 134D within exit plane 112.

Figure 6:
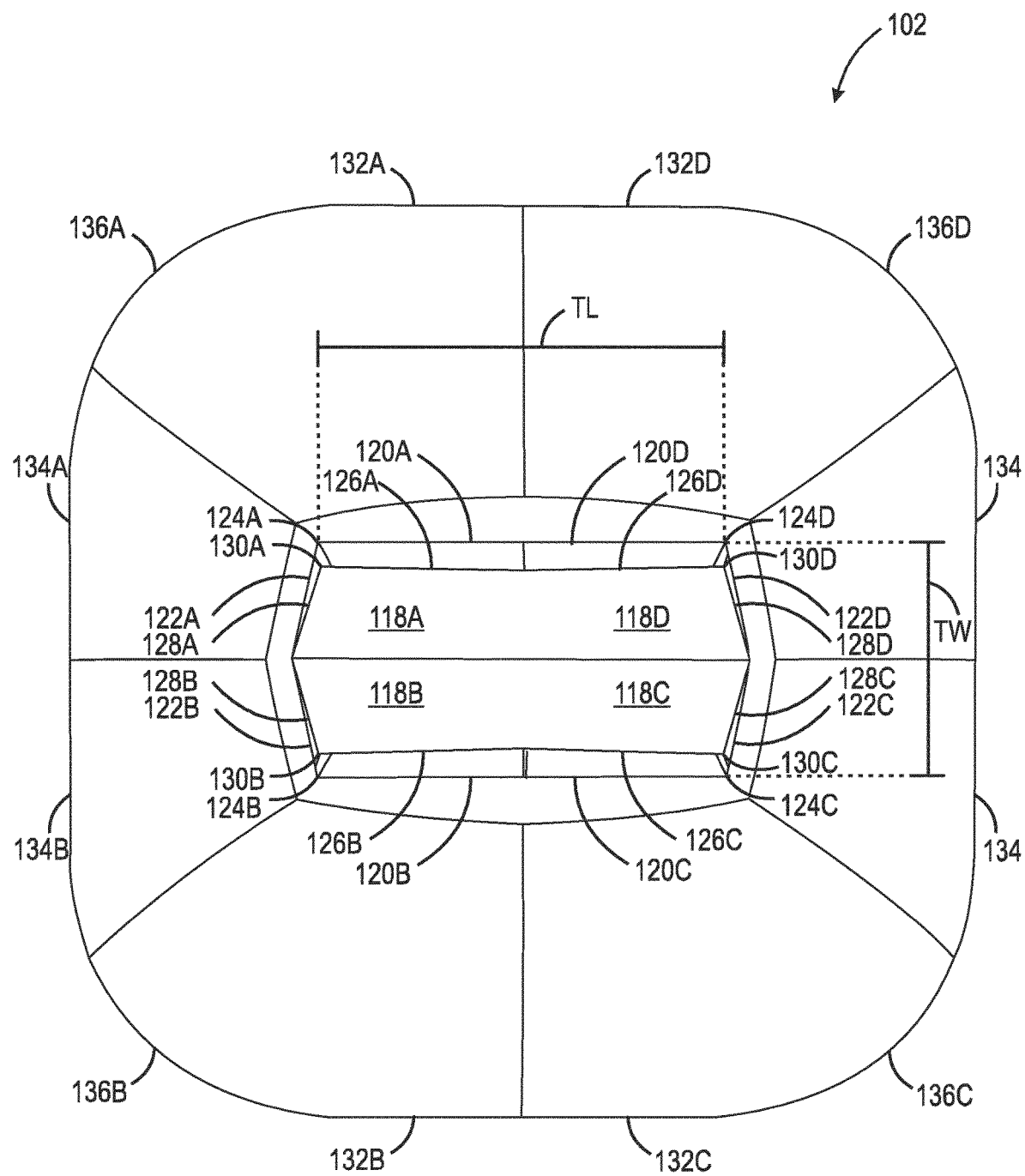
FIG. 6 is a top plan view of a TIR lens according to the present disclosure.

FIG. 6 illustrates a top plan view of TIR lens 102 with all four quadrants present. As illustrated, the total width TW of refractive member 108 is less than the total length TL of refractive member 108. As illustrated, the total width TW is represented as the combination of the width of bottom lateral edge 122A (i.e., first width W1) and the width of bottom lateral edge 122B, (i.e., first width W1). Similarly, the total length TL of the refractive member 108 is represented as a combination of the length of bottom longitudinal edge 120A (i.e., first length L1) and the length of bottom longitudinal edge 120D (i.e., first length L1). Thus, total width TW of refractive member 108 can be represented as 2×W1 and the total length TL can be represented as 2×L1.

As illustrated in FIGS. 3A-6, the downward sloping middle lateral edges, i.e., middle lateral edges 128A-128D, slope toward a central edge 142 shared by all four portions of refractive member 108, i.e., portions 118A-118D. For example, middle lateral edge 128A and middle lateral edge 128B slope in a downward direction from their respective middle corners until they meet at a first end of central edge 142. Similarly, middle lateral edges 128C and 128D slope in a downward direction from their respective middle corners until they meet at a second end of central edge 142. As such, central edge 142 is a substantially longitudinal edge arranged substantially parallel with middle longitudinal edges 126A-126D and bottom longitudinal edges 120A-120D. Additionally, as illustrated, central edge 142 is arranged substantially coincident with longitudinal cross-sectional plane 138. It should be appreciated that middle lateral edges 128A-128D, as they extend from each respective middle corner 130A-130D, respectively, can extend at an upward angle, a downward angle or no angle, with respect to exit plane 112, and therefore, central edge 142 may be positioned above, below, or parallel with middle longitudinal edges 126A-126D.

FIG. 7A-7B illustrated top plan views of two example embodiments of TIR lens 102. FIG. 7A illustrates a top plan view of one example embodiment of TIR lens 102 where each top corner 136A-136D is filleted where each fillet has a first radius, e.g., a radius of 0.635 cm (0.25 inches). FIG. 7B illustrates a top plan view of another example embodiment of TIR lens 102 where each top corner 136A-136D is filleted where each fillet has a second radius, e.g., a radius of 0.254 cm (0.1 inches). As set forth above, it should be appreciated that the radius of the fillets of each corner can be selected from any radius between 0.254 cm to 0.635 cm (0.1 inches to 0.25 inches). As will be discussed below, the magnitude of the radius of the fillets chosen operates to control the light rays beam spread that exits exit plane 112 of TIR lens 102. Adjusting the fillet radius of the top corners 136A-136D controls the amount of light incident on the TIR profile with only small variations on the narrow portion of the beam. As can be seen in the top plan views illustrated in FIGS. 7A and 7B, the filleted corners 136A-136D along with the top longitudinal edges 132A-132D and top lateral edges 134A-134D form a square-like shape, i.e., a shape that is substantially square with rounded corners. Additionally, these views also illustrate that middle longitudinal edges 126A-126D (shown in FIG. 6) and middle lateral edges 128A-128D (shown in FIG. 6) form a irregular octagon shape, while bottom longitudinal edges 120A-120D and bottom lateral edges 122A-122D for an irregular hexagon shape. It should be appreciated that the middle edges may form an irregular hexagon shape and the bottom edges can form an irregular octagon shape. The shape taken may be altered by altering an inner angle 144 of each corner (e.g., bottom corners 124A-124D and middle corners 130A-130D). In the examples shown, inner angle 144 is 100.98 degrees; however, it should be appreciated that inner angle 144 can be any obtuse angle or a right angle.

Figure 8A:
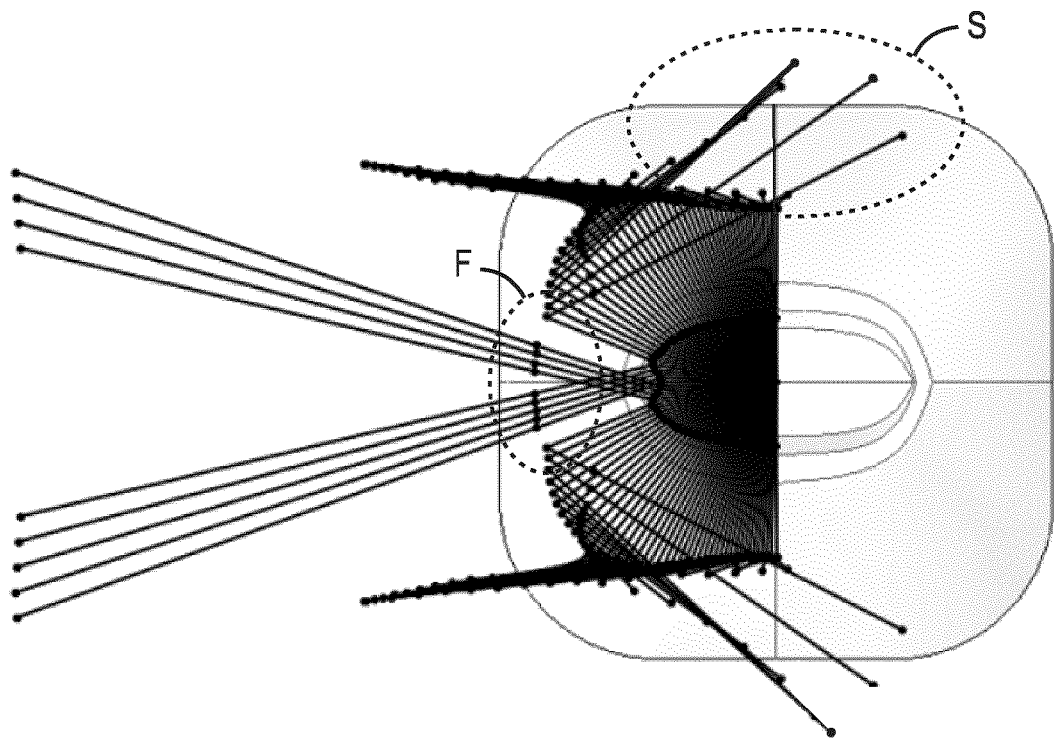
FIG. 8A is a top plan view of a TIR lens with ray tracing according to the present disclosure.
Figure 8B:
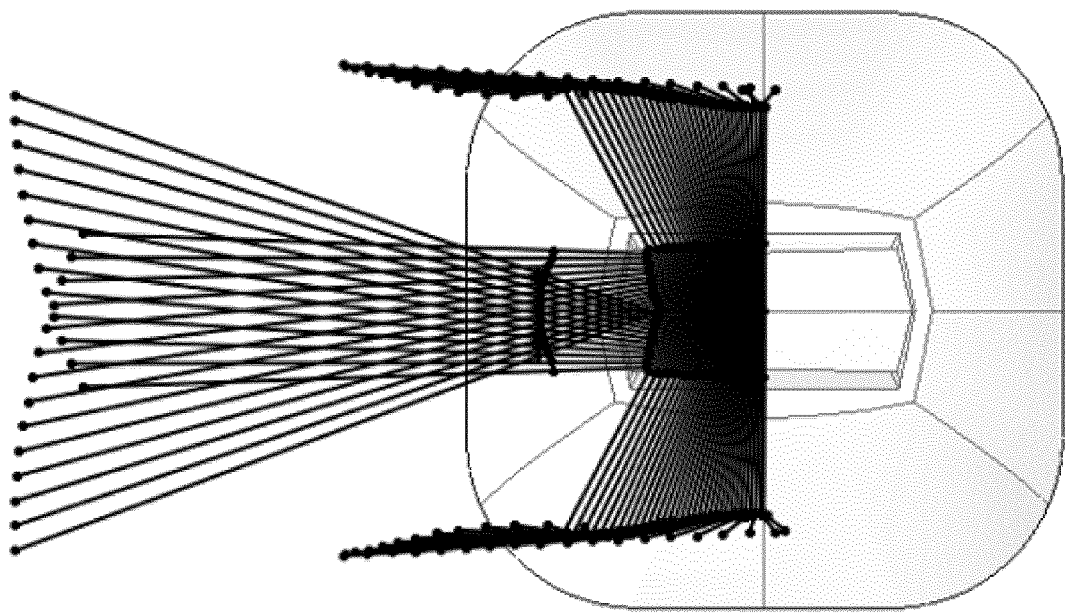
FIG. 8B is a top plan view of a TIR lens with ray tracing according to the present disclosure.

FIG. 8A is a top plan view of a lens with ray tracing where the edges of the refractive member are curved. As illustrated, use of curved or rounded edges causes flares F and striations S in the ray-trace pattern of electromagnetic radiation 106 which is not desirable. This stems from the lack of control of the light pattern or the light distribution extending from the TIR lens 102. FIG. 8B is a top plan view of the TIR lens 102 of the present disclosure, where the longitudinal and lateral edges (bottom and middle) of the refractive member allow for greater control of the light distribution which results in significantly less or no noticeable flaring and no visible striations, where the rays run along the wall W.

Figure 10:
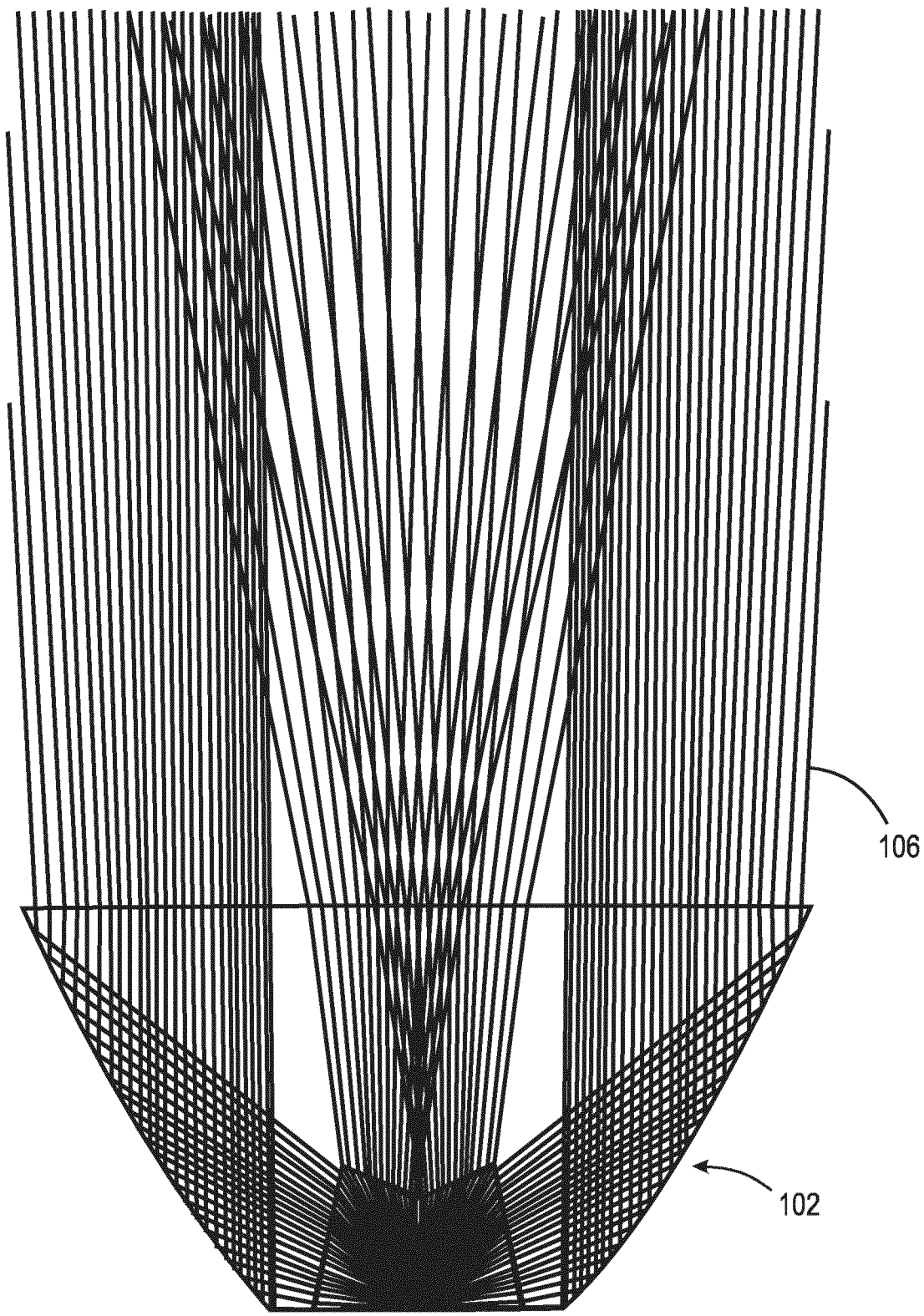
FIG. 10 is a lateral cross-sectional profile of a TIR lens according to the present disclosure.

FIGS. 9-10 illustrate a longitudinal side profile and a lateral side profile of TIR lens 102 of the present disclosure with ray tracing. As illustrated, the ray-trace electromagnetic radiation 106 that leaves exit plane 112 (shown in FIG. 2), is a controlled, substantially homogenous beam with no noticeable flaring and no noticeable striations or shadows. In both the longitudinal side profile and the lateral side profile illustrated, the transition between the straight lines for the middle longitudinal edges 126A-126D and the middle lateral edges 128A-128D allow for a clean transition between the reflected/refracted light rays or electromagnetic radiation 106 which results in reduced or eliminated flares, striations, and shadows.

Figure 11B:
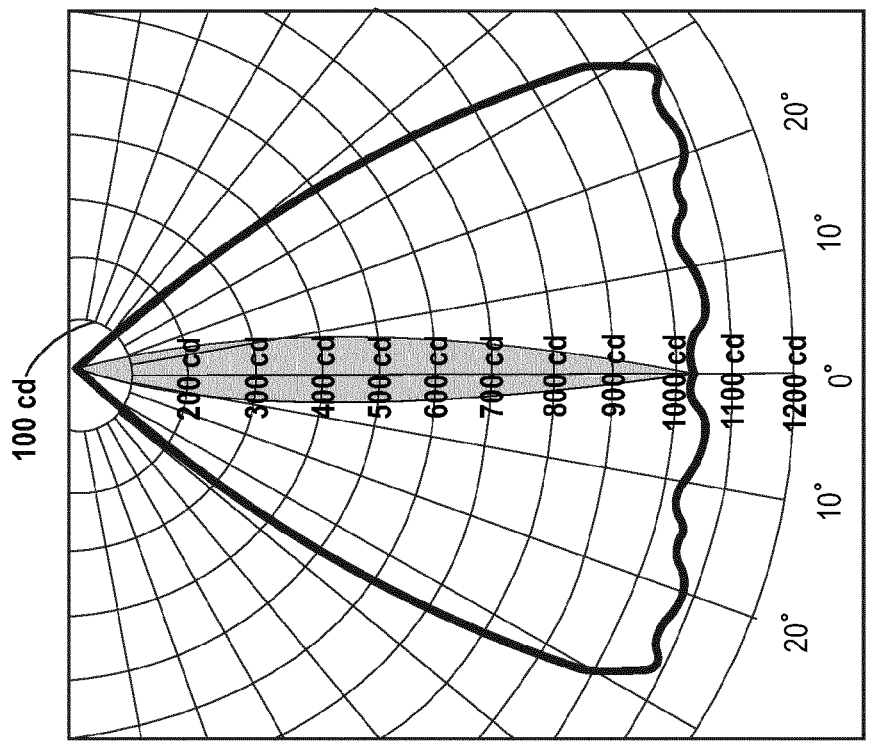
FIG. 11B is a polar distribution according to the present disclosure.
Figure 11A:
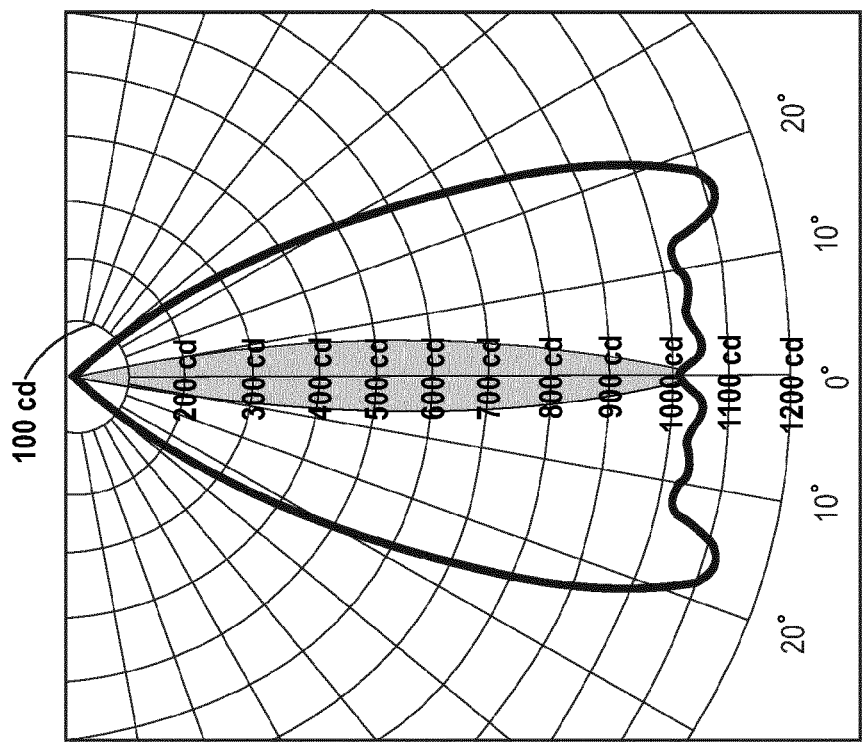
FIG. 11A is a polar distribution according to the present disclosure.

FIGS. 11A and 11B illustrate polar distributions of visible light or electromagnetic radiation 106 of TIR lenses 102 illustrated and described with respect to FIGS. 7A and 7B, respectively, across a range of luminous intensities measured in candelas (abbreviated "cd"). As illustrated, through the range of luminous intensities, e.g., from 100 cd to approximately 1000 cd, the light distribution is substantially smooth and homogenous with no bulging illustrating substantial control over the polar distribution. FIGS. 11A and 11B represent asymmetric beam distributions of 10°×55° and 10°×75° respectively.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A total internal reflection (TIR) lens comprising:
   a refractive member having a body protruding in a first direction with respect to an electromagnetic source, the refractive member configured to receive electromagnetic radiation from the electromagnetic source and refract the electromagnetic radiation, the refractive member comprising:
   a plurality of bottom longitudinal edges and a plurality of bottom lateral edges, wherein each bottom lateral edge forms a corner with at least one bottom longitudinal edge that creates an obtuse angle between the bottom lateral edge and bottom longitudinal edge forming the corner, wherein there are at least six total edges of the plurality of bottom longitudinal edges and the plurality of bottom lateral edges, and
   a collimator arranged about the refractive member, the collimator comprising:
   an inner surface configured to receive at least a portion of the refracted electromagnetic radiation from the refractive member and refract the electromagnetic radiation through an exit plane of the lens,
   a first top longitudinal edge,
   a first top lateral edge, and
   a first top corner formed between the first top longitudinal edge and the first top lateral edge.

2. The TIR lens of claim 1, wherein at least one of the plurality of bottom longitudinal edges and at least one of the plurality of bottom lateral edges is a straight edge.

3. The TIR lens of claim 1, wherein at least one of the plurality of bottom longitudinal edges and plurality of bottom lateral edges is curved or rounded.

4. The TIR lens of claim 1, wherein the first top corner is filleted, wherein the fillet is selected from a range between 0.254 cm and 0.635 cm.

5. The TIR lens of claim 1, wherein the collimator further comprises:
   a second top longitudinal edge;
   a second top lateral edge; and
   a second top corner formed between the second top longitudinal edge and the second top lateral edge.

6. The TIR lens of claim 1, wherein at least one corner is chamfered, filleted, or curved.

7. A luminaire having a plurality of TIR lenses of claim 1.

8. The luminaire of claim 7, wherein the luminaire is a wall grazer.

9. The TIR lens of claim 1, wherein the plurality of bottom lateral edges each abut another of the plurality of bottom lateral edges.

10. The TIR lens of claim 9, wherein an angle formed where each bottom lateral edges abut another of the plurality of bottom lateral edges forms a right angle or an obtuse angle.

11. The TIR lens of claim 10, wherein where each bottom lateral edges about another of the plurality of bottom lateral edges forms a corner, the corner is chamfered, filleted, or curved.

12. The TIR lens of claim 1, further comprising: a plurality of middle longitudinal edges and a plurality of middle lateral edges, wherein the total of the plurality of middle longitudinal edges and plurality of middle lateral edges is greater than the total of the plurality of bottom longitudinal edges and the plurality of bottom lateral edges.

13. The TIR lens of claim 12, wherein at least one of the plurality of middle longitudinal edges and plurality of middle lateral edges is a straight edge.

\* \* \* \* \*